United States Patent
Tsujita et al.

(10) Patent No.: US 7,878,381 B2
(45) Date of Patent: Feb. 1, 2011

(54) PLATE MATERIAL CUTTING UNIT, PLATE MATERIAL CUTTING APPARATUS EQUIPPED WITH THE PLATE MATERIAL CUTTING UNIT, AND PLATE MATERIAL CUTTING SYSTEM EQUIPPED WITH THE PLATE MATERIAL CUTTING APPARATUS

(75) Inventors: Keiji Tsujita, Kobe (JP); Hideyuki Tanaka, Kobe (JP); Morimasa Kuge, Kobe (JP); Syuichi Nakayama, Kakegawa (JP); Susumu Sugiyama, Kakegawa (JP)

(73) Assignees: Corning Japan K.K., Tokyo (JP); Kawasaki Plant Systems Kabushiki Kaisha, Kobe-shi, Hyogo (JP)

( * ) Notice: Subject to any disclaimer, the term of this patent is extended or adjusted under 35 U.S.C. 154(b) by 460 days.

(21) Appl. No.: 11/921,404

(22) PCT Filed: Jun. 2, 2006

(86) PCT No.: PCT/JP2006/311102

§ 371 (c)(1),
(2), (4) Date: Nov. 30, 2007

(87) PCT Pub. No.: WO2006/129798

PCT Pub. Date: Dec. 7, 2006

(65) Prior Publication Data

US 2009/0126550 A1    May 21, 2009

(30) Foreign Application Priority Data

Jun. 2, 2005    (JP) .............................. 2005-162243

(51) Int. Cl.
*C03B 33/02*    (2006.01)

(52) U.S. Cl. ...................................... 225/96.5; 225/96

(58) Field of Classification Search ..................... 225/2, 225/96, 96.5; 83/35, 879, 883, 884, 886
See application file for complete search history.

(56) References Cited

U.S. PATENT DOCUMENTS 7,131,562 B2 * 11/2006 Ueyama et al. ............ 225/96.5

FOREIGN PATENT DOCUMENTS

| JP | 9-124330 | | 5/1997 |
|---|---|---|---|
| JP | 10118583 | * | 5/1998 |
| JP | 10-338534 | | 12/1998 |
| JP | 2004-167833 | | 6/2004 |

(Continued)

*Primary Examiner*—Stephen Choi
(74) *Attorney, Agent, or Firm*—McGinn IP Law Group, PLLC

(57) ABSTRACT

A plate material cutting unit is equipped with: support devices for supporting the lower edge of an upright plate material; fluid guides for applying fluid pressure on a surface of the plate material which is held upright on the support devices, to support the plate material in a non-contact manner; a scribe forming device, equipped with a scribing blade for forming a scribe for cutting on the plate material, by moving along the surface of the plate material, which is supported by the fluid guides; a clamp, for gripping a portion of the plate material adjacent to the movement trajectory of the scribing blade along the plate material; and a cutting device, equipped with a pressing member for pressing a portion of the plate material opposite the scribe in a planar direction with respect to the portion of the plate material which is gripped by the clamp.

21 Claims, 10 Drawing Sheets

FOREIGN PATENT DOCUMENTS

| | | | |
|---|---|---|---|
| JP | 2004168496 | * | 6/2004 |
| JP | 2004216568 | * | 8/2004 |
| JP | 2004-244229 | | 9/2004 |

* cited by examiner

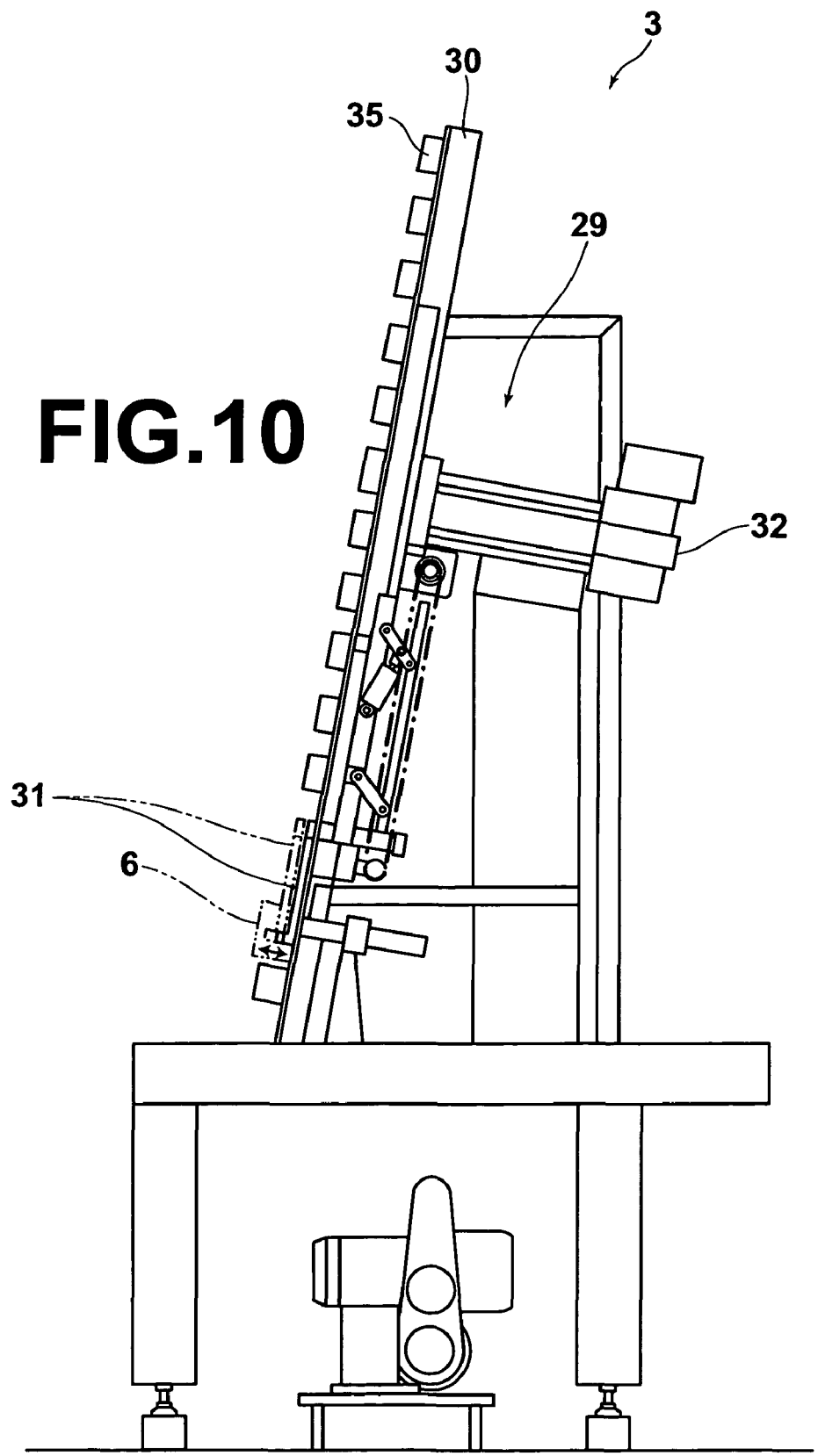

PLATE MATERIAL CUTTING UNIT, PLATE MATERIAL CUTTING APPARATUS EQUIPPED WITH THE PLATE MATERIAL CUTTING UNIT, AND PLATE MATERIAL CUTTING SYSTEM EQUIPPED WITH THE PLATE MATERIAL CUTTING APPARATUS

TECHNICAL FIELD

The present invention relates to a plate material cutting unit, for forming scribes on and cutting various plate materials, such as rare metal plates, silicon plates, and plates for flat panel displays at the scribes. The present invention also relates to a cutting apparatus equipped with the plate material cutting unit, and a plate material cutting system equipped with the cutting apparatus, for efficiently cutting plate materials.

BACKGROUND ART

Conventionally, glass plates are utilized in various fields. Glass plates (hereinafter, referred to as glass substrates) which are employed for liquid crystal displays, plasma displays, and the like, are particularly thin. A great number of glass plates are being produced, with thicknesses of approximately 0.7 mm and sizes of 550 mm×650 mm. In conventional facilities, conveyance, trimming, and cutting of these glass plates are performed with the glass plates in a horizontal state (laid down).

When processing glass plates in the horizontal state in conventional facilities, there is a possibility that the glass plates will break due to their own weight, or by forces applied thereto by structural members that support and convey the glass plates, as the glass plates become larger and thinner. In addition, processing apparatuses will become larger, the installation areas thereof increase, and costs increase if the large glass plates are processed in the horizontal state. Further, maintenance will become difficult with the increase in the size of the apparatuses.

For these reasons, the present applicant has proposed a plate material cutting system equipped with: a fluid guide, for supporting plate materials, which are processing targets, in a non-contact manner; a scribe forming device, for forming scribes for cutting (also called scribes) onto the plate materials in this state; and a cutting device, for cutting the plate materials at the scribes (refer to Japanese Unexamined Patent Publication No. 2004-167833, for example). By using this system, scribing onto plate materials can be performed without the plate materials being influenced by their own weight or supporting forces applied by structural members, then the plate materials can be cut.

However, in this system, the plate materials are conveyed in an upright state, the scribing device scribes the plate materials in the vertical direction, a rotating device rotates the plate materials 90°, the scribing device scribes the plate materials in the vertical direction (the horizontal direction prior to rotation) again, then the plate materials are conveyed to the cutting device, to perform cutting at the scribes (including trimming of the peripheral edges of the plate materials).

In this manner, it is necessary to convey the plate materials to the cutting device after they are scribed by the scribing device. In addition, the scribing device and the cutting device have dimensions in their conveyance directions, which are much longer than the widths of the plate materials, and it is necessary to install both the scribing device and the cutting device, in order to cut the plate materials. Accordingly, the system as a whole becomes greatly elongated. In addition, conventional rotating devices rotate plate materials with the lower corners thereof as the center of rotation, and therefore, it is necessary for the width of the rotating device to be twice that of the plate material or greater.

Recently, glass plates for liquid crystal panels are becoming larger. Therefore, the length and size of the system need to be made even larger. There is a problem that such a large system cannot be installed in existing facilities.

The present invention has been developed to solve the aforementioned problem. It is an object of the present invention to provide a compact plate material cutting unit capable of scribing and cutting plate materials, such as large thin glass plates, without reducing the quality of the cut plate materials. It is another object of the present invention to provide a cutting apparatus equipped with the plate material cutting unit. It is still another object of the present invention to provide a system equipped with the cutting apparatus.

DISCLOSURE OF THE INVENTION

A plate material cutting unit of the present invention comprises:

support devices for supporting the lower edge of an upright plate material;

fluid guides for applying fluid pressure on a surface of the plate material which is held upright on the support devices, to support the plate material in a non-contact manner;

a scribe forming device, equipped with a scribing blade for forming a scribe for cutting on the plate material, by moving along the surface of the plate material, which is supported by the fluid guides;

a clamp, for gripping a portion of the plate material adjacent to the movement trajectory of the scribing blade along the plate material; and a cutting device, equipped with a pressing member for pressing a portion of the plate material opposite the scribe in a planar direction with respect to the portion of the plate material which is gripped by the clamp.

The clamp, the scribe forming device, and the cutting device are provided adjacent to each other in this manner. Therefore, conveyance of the plate material is obviated, enabling scribing and cutting to be performed at a single location.

To positively form the scribe on the surface of the plate material, the plate material cutting unit of the present invention may be of a configuration, wherein:

the scribing blade is provided on a first side of the plate material; and a scribing support for supporting the plate material during formation of the scribe is provided on a second side of the plate material at a position facing the scribing blade.

It is preferable for the plate material cutting unit of the present invention to be of a configuration, wherein:

the clamp is equipped with a clamp member and a clamp support, for gripping the plate material from both sides;

the clamp member is provided on the first side of the plate material, and the clamp support is provided on a second side of the plate material; and the clamp member and the clamp support are configured to grip the plate material therebetween by the clamp member advancing toward the plate material.

Thereby, clamping of the plate material is enabled during scribing and cutting, when gripping of the plate material is necessary.

It is preferable for the plate material cutting unit of the present invention to be of a configuration, wherein:

the clamp is equipped with a clamp member and a clamp support, for gripping the plate material from both sides;

the clamp member is provided on the first side of the plate material, and the clamp support is provided on the second side of the plate material;

the scribing support is movable between a supporting position adjacent to the clamp support, at which the scribing support supports the plate material during formation of the scribe, and a retracted position away from the supporting position; and the scribing support is moved to the retracted position when the pressing member presses the plate material.

The pressing member of the cutting device is enabled to press the vicinity of the gripped portion of the plate material by the retraction of the scribing support. That is, the pressing member is enabled to press the vicinity of the clamp support. This enables cutting at the scribe.

The plate material cutting unit of the present invention may be of a configuration, wherein:

the scribing blade is capable of being advanced toward and retracted from the plate material; and the scribing blade is retracted from the plate material when the pressing member presses the plate material.

In addition, the plate material cutting unit of the present invention may be of a configuration, wherein:

the fluid guides are provided at least on the second side of the plate material.

By adopting the above configuration, the fluid guides can be provided on the opposite side of the plate material from the scribing blade, and inadvertent cutting of the plate material during formation of the scribe can be prevented.

The plate material cutting unit of the present invention may be of a configuration, wherein:

the support devices constitute a conveyance device that conveys the plate material in the horizontal direction while supporting the plate material in an upright state; and the fluid guides are provided along the conveyance path of the conveyance device.

By adopting the above configuration, the conveyance device and the fluid guides are enabled to convey the plate material into and out of the plate material cutting unit in an upright state.

The plate material cutting apparatus of the present invention comprises:

a pair of the plate material cutting units of the present invention, each cutting unit being provided separated from each other in the horizontal direction on one side of a plate material;

second support devices for supporting the lower edge of the upright plate material, provided between the pair of plate material cutting units; and second fluid guides for applying fluid pressure on a surface of the plate material which is held upright on the second support devices, to support the plate material in a non-contact manner;

the plate material cutting apparatus being configured to cut the left and right sides of the plate material, respectively.

The pair of plate material cutting units are provided separated from each other in the horizontal direction. Therefore, in the case that the plate material is of a rectangular shape, both the left and right edges of the plate material can be trimmed at a single location, without conveying the plate material. In addition, trimming of the left and right edges of the plate material can be performed simultaneously. That is, the width of the cutting apparatus as a whole becomes compact.

The plate material cutting apparatus of the present invention may be of a configuration, wherein:

the clamp, the scribe forming device, and the cutting device of at least one of the pair of plate material cutting units are provided in this order along the planar direction of the plate material from the side closest to the other plate material cutting unit.

By adopting the above configuration, the pair of clamps to the left and right of the plate material can hold the vicinities of the left and right edges of the plate material. In this case, scribing and cutting are performed toward the exterior of the plate material relative to the portions of the plate material held by the clamps. Accordingly, trimming of the left and right edges of the plate material is facilitated.

To enable cutting operations on plate materials of any size, the plate material cutting apparatus of the present invention may be of a configuration, wherein:

at least one of the pair of plate material cutting units is capable of approaching and retreating from the other plate material cutting unit along the planar direction of the plate material.

The plate material cutting apparatus of the present invention may be configured such that:

the second fluid guides are constituted by a left fluid guide of the cutting unit provided toward the left and a right fluid guide of the cutting unit provided toward the right; and each of the left and right fluid guides are constructed by vertically spaced horizontally extending guide members, so as to be capable of engaging each other.

The left and right fluid guides are constructed by the guide members which are arranged in the form of comb teeth, and each fluid guide is capable of engaging the other by fitting the guide members thereof into the spaces of the other fluid guide. Accordingly, areas at which the fluid guides are not present can be eliminated, when the plate material cutting units approach and separate from each other.

The plate material cutting apparatus of the present invention may further comprise:

a plurality of alignment members for engaging with the bottom edge of the plate material to elevate the plate material;

the alignment members being configured to be capable of being positioned such that a line that connects the alignment members is perpendicular with respect to a vertical trajectory of the scribing blade.

By adopting the above configuration, the bottom edge of the plate material can be positioned to be perpendicular with respect to the vertical trajectory of the scribing blade. Accordingly, when the four edges are ultimately trimmed, the perpendicularity of the edges can be maintained.

The plate material cutting apparatus of the present invention may be configured such that:

the support devices constitute a conveyance device that conveys the plate material in the horizontal direction while supporting the plate material in an upright state; and the fluid guides are provided along the conveyance path of the conveyance device.

By adopting the above configuration, the conveyance device and the fluid guides are enabled to convey the plate material into and out of the plate material cutting apparatus in an upright state.

The plate material cutting system of the present invention comprises:

a plate material cutting apparatus; and a rotating apparatus provided adjacent to the plate material cutting apparatuses, the rotating apparatus being equipped with a rotating unit, for rotating plate materials, which are supported in an upright state within the conveyance path of the conveyance devices of the cutting apparatuses, substantially within the planes thereof; wherein:

the cutting apparatus is one of the cutting apparatuses of the present invention.

According to this construction, in the case that the plate material is of a rectangular shape, the four edges of the plate material can be trimmed while being conveyed. That is, the rotating apparatus rotates the plate material 90°, and therefore, the same scribe forming device can scribe perpendicular edges (an edge in the X direction and an edge in the Y direction), which can then be cut. Further, the adjacent plate material cutting apparatuses are compact, and therefore the entire system can be compact.

According to the present invention, scribing and cutting of plate materials can be performed at a single location. As a result, miniaturization of cutting apparatuses and cutting systems is enabled, and the quality of the processed plate materials can be improved.

BRIEF DESCRIPTION OF THE DRAWINGS

FIG. 10 is a side view of the rotating apparatus of FIG. 9.

BEST MODE FOR CARRYING OUT THE INVENTION

Hereinafter, embodiments of the plate material cutting unit, the cutting apparatus equipped with the cutting unit, and the cutting system equipped with the cutting apparatus according to the present invention will be described with reference to the attached drawings.

Figure 1:
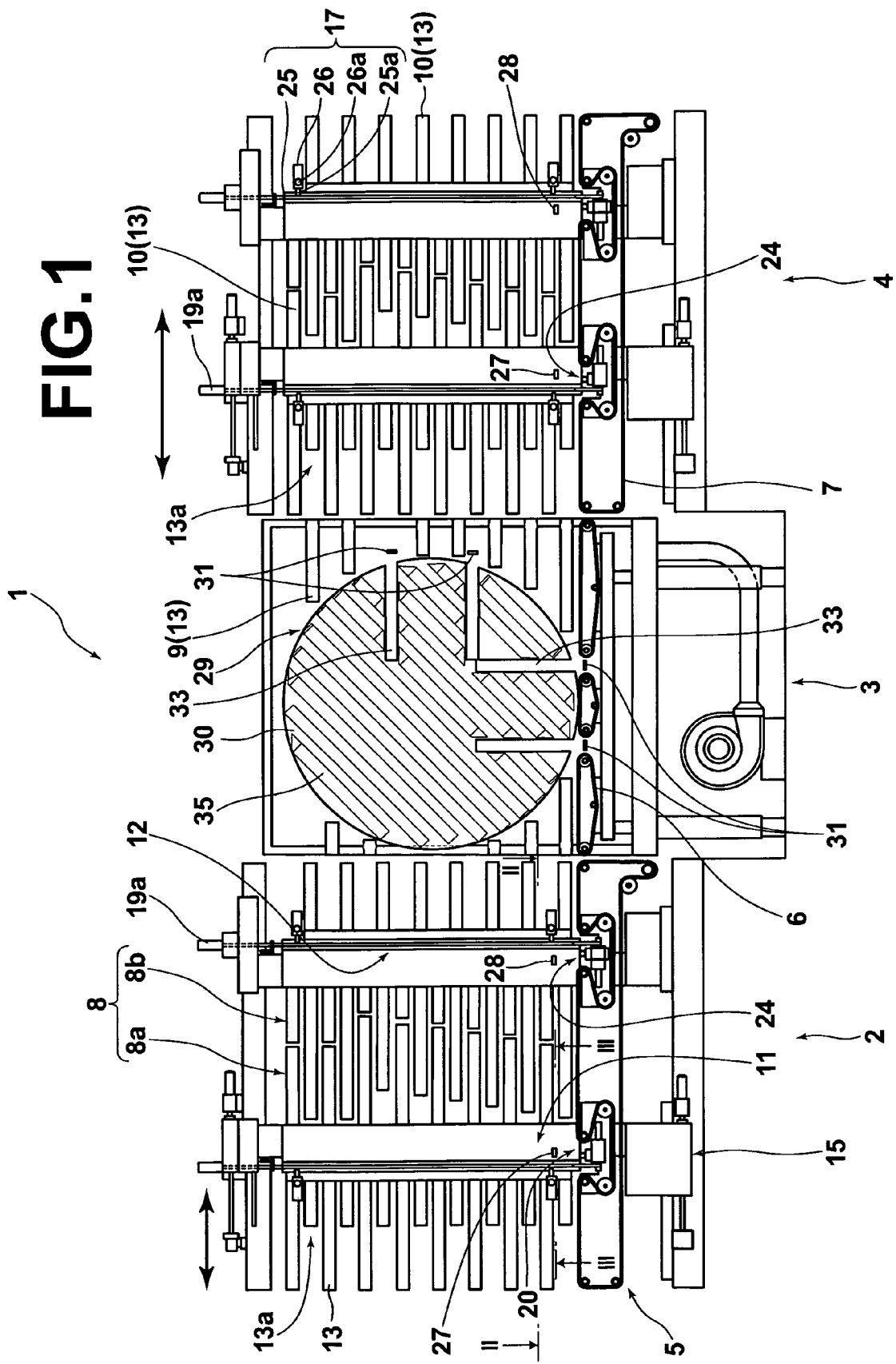
FIG. 1 is a front view of a plate material cutting system according to an embodiment of the present invention.

FIG. 1 is a front view of a plate material cutting system 1 according to an embodiment of the present invention.

The plate material cutting system 1 of FIG. 1 supports the bottom edge of a rectangular glass plate G in an upright state with a conveyor, and trims the four edges of the glass plate while conveying it in the horizontal direction. Trimming refers to cutting and removing the parts of the glass plate G toward the exterior of lines along the edges thereof. The plate material cutting system 1 is a combination of a short side cutting apparatus 2 at the left side of FIG. 1, a rotating apparatus 3 at the center, and a long side cutting apparatus 4 at the right side of FIG. 1. The rectangular glass plate G is conveyed into the short side cutting apparatus 2 of the system 1 at the left side of FIG. 1, the horizontality and verticality thereof are adjusted, and the leading and trailing edges, which are the short sides of the rectangle, are trimmed.

Next, the glass plate G is conveyed to the rotating apparatus 3, and rotated 90° substantially within the plane of the glass plate, about the center thereof. When the glass plate G is rotated 90°, the bottom edge which had been supported by the conveyor prior to rotation becomes either a leading edge or a trailing edge. In addition, the trimmed edges, which were the leading and trailing edges prior to rotation, become the upper and lower edges.

Thereafter, the glass plate G is conveyed to the long side cutting apparatus 4, the horizontality and the verticality thereof are adjusted, and the leading and trailing edges (the upper and lower edges prior to rotation), which are the long sides of the rectangle, are trimmed. The short side cutting apparatus 2 and the long side cutting apparatus 4 differ only in the lengths of the glass plate G that they trim, and are basically of the same structure.

The bottom edge of the glass plate G is supported by belt conveyors 5, 6, and 7 of each of the apparatuses 2, 3, and 4, respectively. The heights of the conveying surface of the belt conveyors 5, 6, and 7 are matched. The present invention is not limited to the use of belt conveyors, however, and other known conveyors, such as roller conveyors, may be employed.

Fluid guides 8, 9, and 10, for supporting a surface of the glass plate G in a non contact manner, are provided in each of the apparatuses 2, 3, and 4, at one side of the conveyance path defined by the conveyors.

Figure 2:
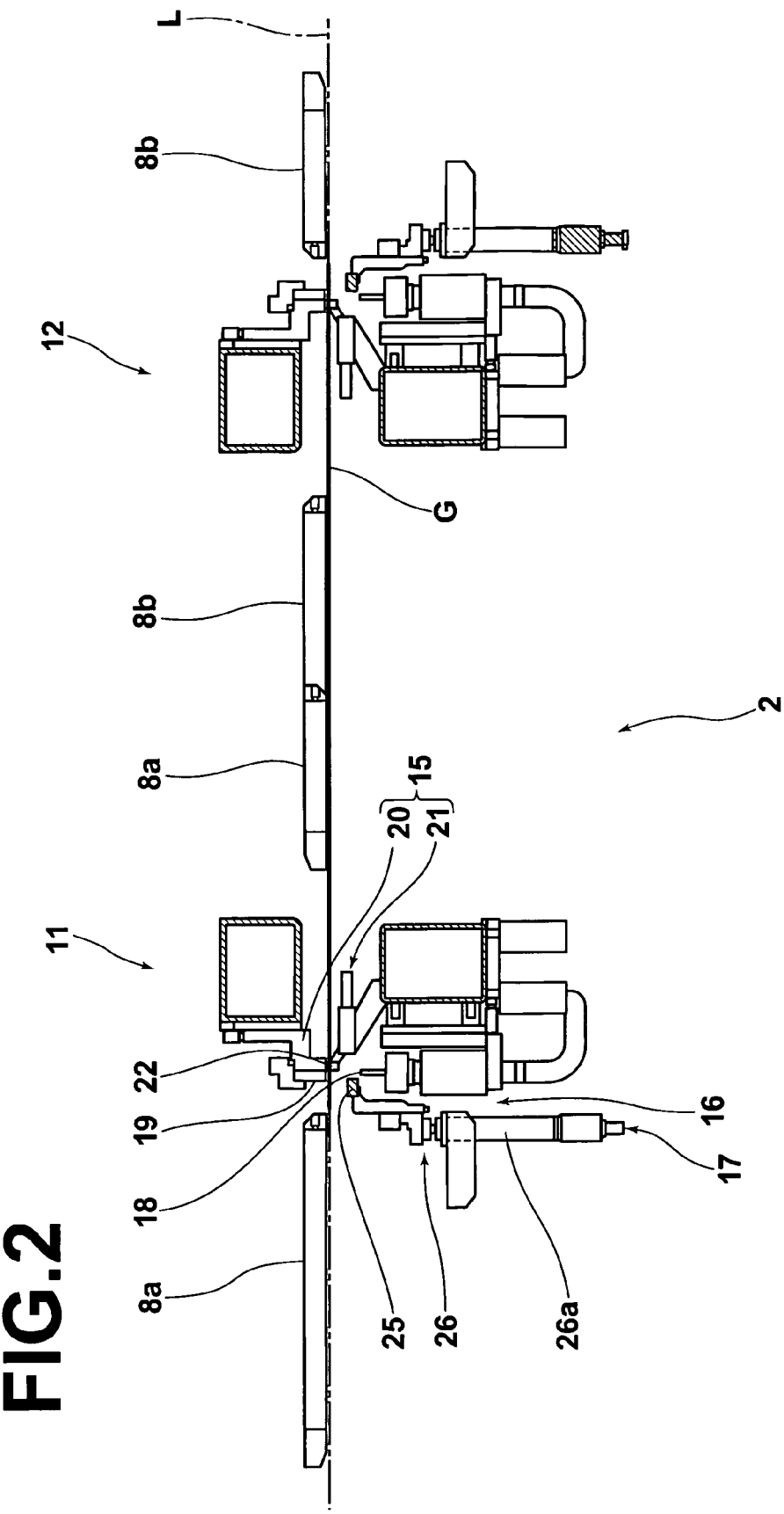
FIG. 2 is a view taken along line II-II of FIG. 1.

FIG. 2 is a view of the short side cutting apparatus 2, taken along line II-II of FIG. 1. As illustrated in FIG. 1, a pair of horizontally spaced cutting units 11 and 12 for cutting the leading and trailing edges of the glass plate G are provided in the short side cutting apparatus 2. Fluid guides 8a and 8b are mounted on both sides of each of the cutting units 11 and 12.

The fluid guides 8, 9, and 10 are constructed by vertically spaced, horizontally extending guide members 13. As illustrated in FIG. 1, the plurality of guide members 13 are arranged as comb teeth. A fluid guide 8a of the left cutting unit 11 (left fluid guide) and a fluid guide 8b of the right cutting unit 12 (right fluid guide) are engaged with each other. That is, the guide members 13 of one fluid guide are fitted within the spaces between the guide members 13 of the other fluid guide.

In the present embodiment, the left cutting unit 11 is configured to be movable a predetermined amount in a direction L of the conveyance path of the glass plate G. This construction enables changes in the cutting position corresponding to the sizes of glass plates. The right cutting unit 12 may also be configured to be movable. However, positioning of glass plates, which are conveyed into the system 1 from the left side of FIG. 1, in the cutting apparatus 4 is performed at the leading edges thereof. Therefore, fixing the right cutting unit 12, which cuts the leading edge of the glass plates, facilitates control during positioning. When the cutting unit 11 is moved, the left fluid guide 8a and the right fluid guide 8b are relatively displaced. However, because the fluid guides 8a and 8b are of the comb tooth structure and engage each other within the predetermined amount of travel of the cutting unit 11, the fluid guide is continuous along the conveyance path of the glass plates.

Similarly, in the case that a conveyance apparatus (not shown) for conveying glass plates is provided to the left of the short side cutting apparatus 2, the conveyance apparatus may be equipped with a fluid guide configured in a comb tooth manner. Thereby, the fluid guide of the conveyance apparatus can engage the fluid guide 8a on the left side of the left cutting unit 11, such that the fluid guides are continuously provided even if the left cutting unit 11 is moved in the direction L of the conveyance path of the glass plates.

A great number of fluid exhaust apertures (not shown), for applying fluid pressure against the surface of the glass plate G to support it, are provided on the surface of each guide member 13. In the present embodiment, dry air is employed as the fluid to be blown out through the exhaust apertures. It is preferable for a great number of fluid suction apertures and fluid suction grooves to be provided in the guide members 13, in a balanced manner with the fluid exhaust apertures. The provision of the fluid suction apertures and fluid suction grooves enables the exhausted air between the guide members 13 and the glass plate G to escape, and therefore the fluid exhaust can be applied uniformly across the surfaces of the glass plate G. As an alternative to dry air, liquids, such as water, may be employed as the guiding fluid. That is, a porous fluid guide may be provided, in which a porous material is utilized to cause water to seep out of a guide surface. In this case, the surface tension of the water will form a liquid layer having a uniform thickness between the porous fluid guide and the glass plate G, and the glass plate G can be supported without contacting any structural members of the cutting unit. By using liquids as the fluid, cullet particles and dust can be effectively removed from the glass plate G. In addition, a suctioning effect is applied to the glass plate G by the surface tension of the liquid, and therefore, the cutting apparatus can be vertically oriented.

Next, the cutting units 11 and 12 will be described. The cutting units 11 and 12 are basically of the same construction, except for two points. One of the points in which they differ is that one is linearly symmetrical with the other (one is a mirror image of the other). The other point of difference is that the left cutting unit 11 is equipped with a drive device and guide rails for moving glass plates along the direction L of the conveyance path. Accordingly, a description will be given only of the left cutting unit 11.

Alignment pins 24 are provided at the lower ends of the cutting units 11 and 12. The pair of alignment pins 24 adjust the perpendicularity of the glass plate G during scribing and cutting thereof.

As illustrated in FIGS. 3 through 6, the cutting unit 11 is equipped with: a clamp 15, for gripping the glass plate G; a scribe forming device 16, for forming a vertical scribe for cutting on the glass plate G; and a cutting device 17, for cutting the glass plate G at the scribe. As illustrated in FIG. 2, the clamp 15, the scribe forming device 16, and the cutting device 17 of each of the cutting units 11, 12 are provided in this order from the side closest to the other plate material cutting unit 11, 12. This configuration enables gripping of the glass plate G at the interior of the leading and trailing edges thereof by the clamps 15, then scribing and cutting the exteriors of the gripped portions.

The clamp 15, which is provided adjacent to the scribe forming device 16, grips the glass plate G at one side of the vertical trajectory of the scribing blade 18 (toward the interior of the glass plate G). The clamp 15 is constituted by a clamp support 20 and a clamp member 21. The clamp support 20 is provided on the side of the glass plate G opposite the scribing blade 18, and the clamp member 21 is provided on the same side of the glass plate G as the scribing blade 18. A scribing support 19, to be described later, is mounted on the clamp support 20 so as to be retractable. The clamp support 20 and the clamp member 21 fix the glass plate G by sandwiching it therebetween.

Figure 3:
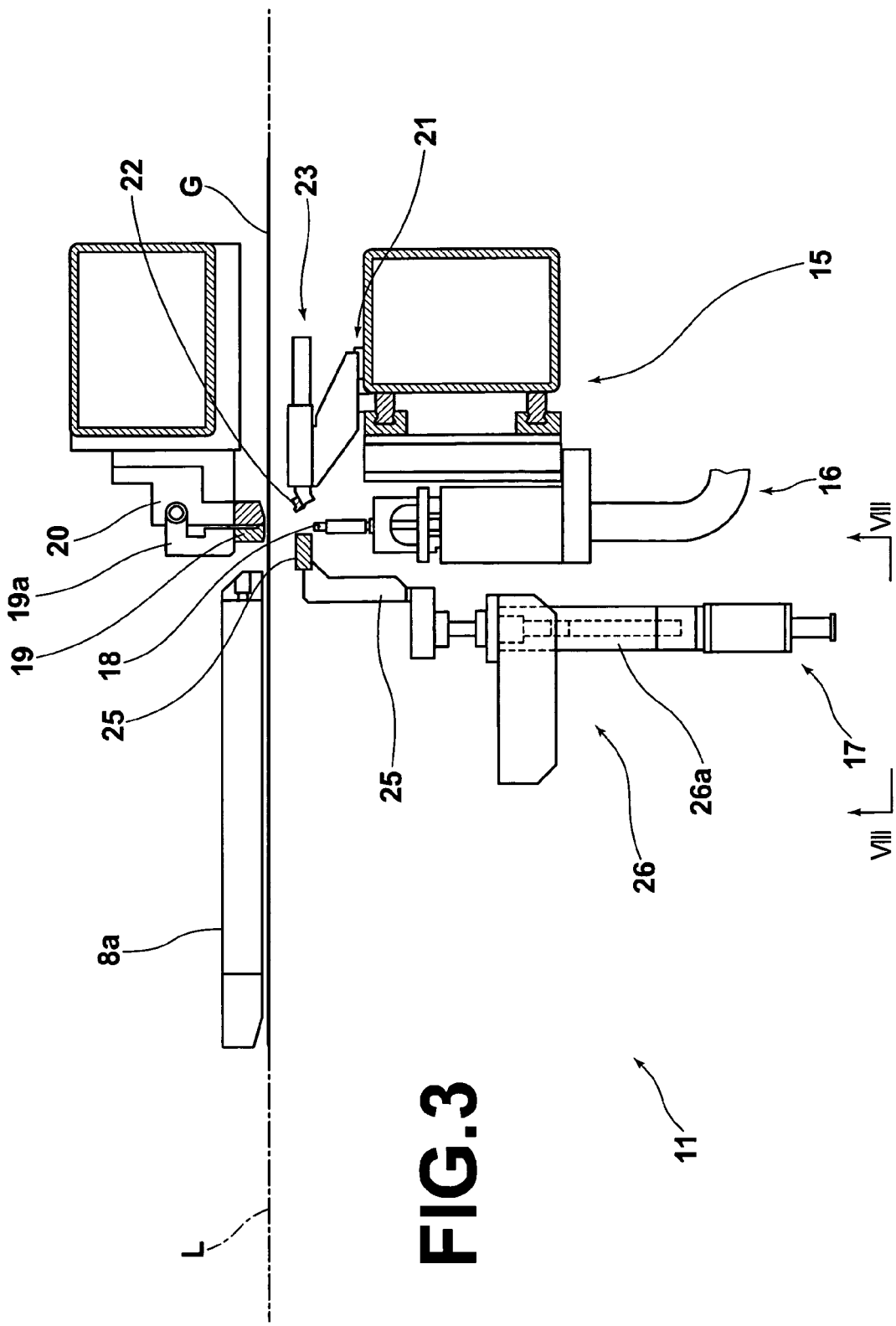
FIG. 3 is a view of a cutting unit of a cutting apparatus, taken along line III-III of FIG. 1.
Figure 4:
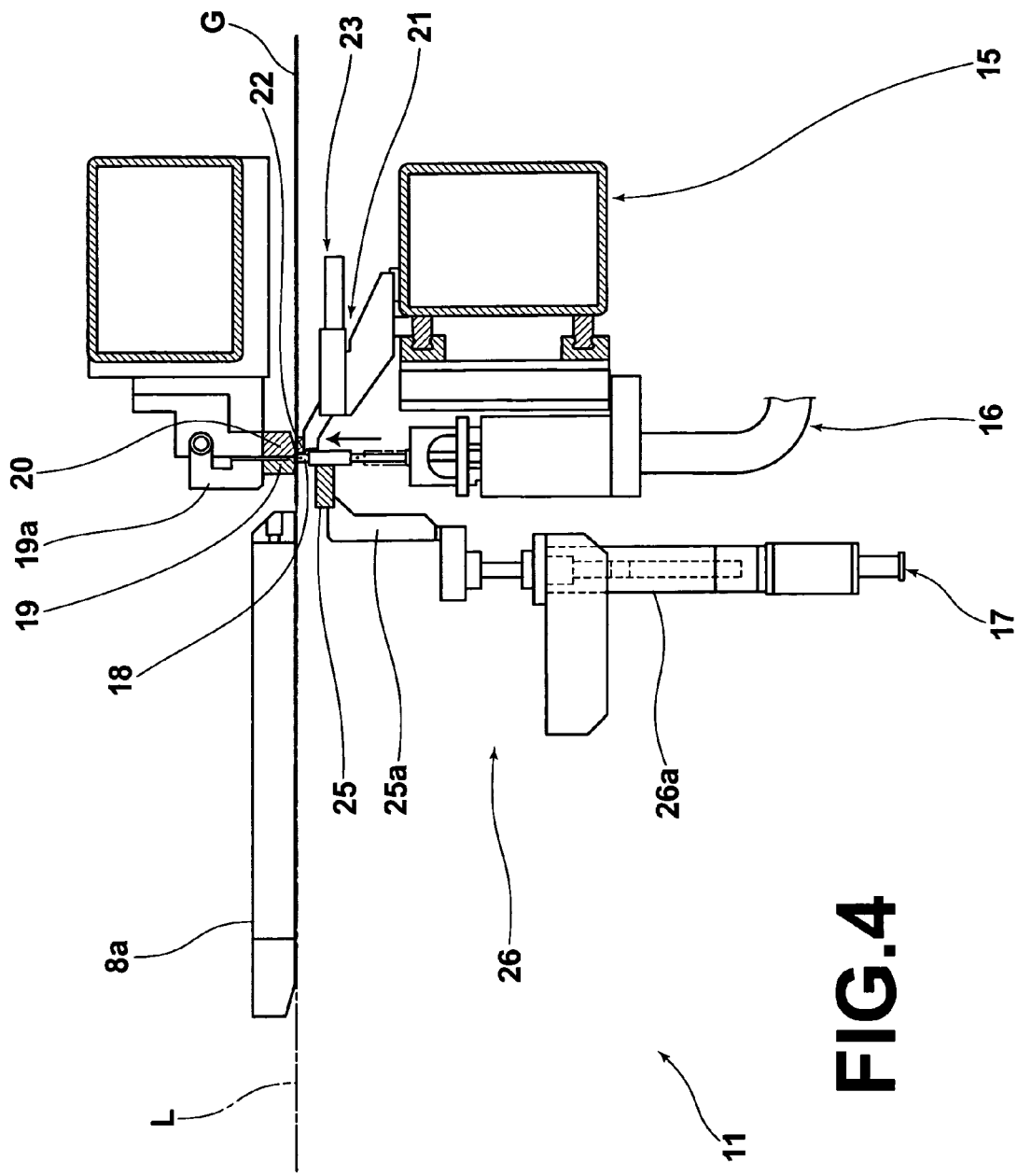
FIG. 4 is a view that illustrates a state in which the cutting unit of FIG. 3 scribes a glass plate, taken along line III-III of FIG. 1.
Figure 5:
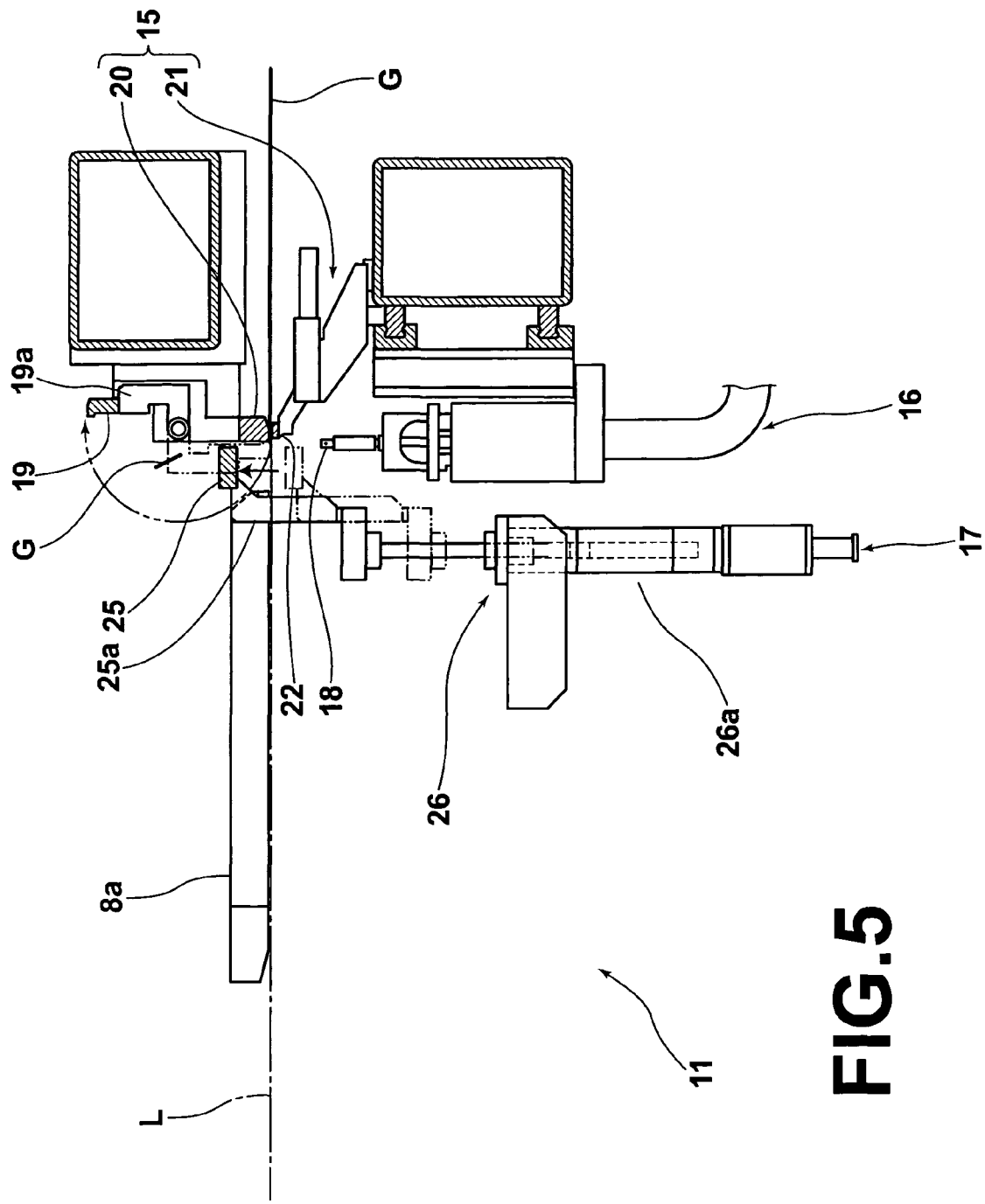
FIG. 5 is a view that illustrates a state in which a cutting bar of the cutting unit of FIG. 3 cuts a glass plate, taken along line III-III of FIG. 1.

FIG. 4 is a view that illustrates a state in which the cutting unit of FIG. 3 scribes a glass plate, taken along line III-III of FIG. 1. At this time, the scribing support is provided on the opposite side of the glass plate G at a position corresponding to the scribing blade 18. The side surfaces of the scribing support 19 and the clamp support 20 are in the vicinity of each other. The scribing support 19 is of a length that covers the distance that the scribing blade travels in the vertical direction. Arms 19a are provided at a plurality of locations on the scribing support 19, so as to mount the scribing support 19 onto the clamp support 20 in a retractable manner. This configuration enables the scribing support 19 to be retracted from the glass plate G during cutting thereof.

The clamp member 21 clamps the glass plate G with the clamp support 20, by advancing a pressing bar 22, to be described later. In this state, the scribing blade is moved from the bottom edge to the top edge of the glass plate G, to form a scribe for cutting on the glass plate. In this step, the scribing blade 18 is moved while sandwiching the glass plate G between the scribing blade 18 and the scribing support 19. At this time, the scribing blade 18 forms the scribe by contacting the glass plate 8 from the side of the glass plate 8 opposite that of the fluid guide 8. This configuration enables prevention of inadvertent cutting of the glass plate G.

Figure 7:
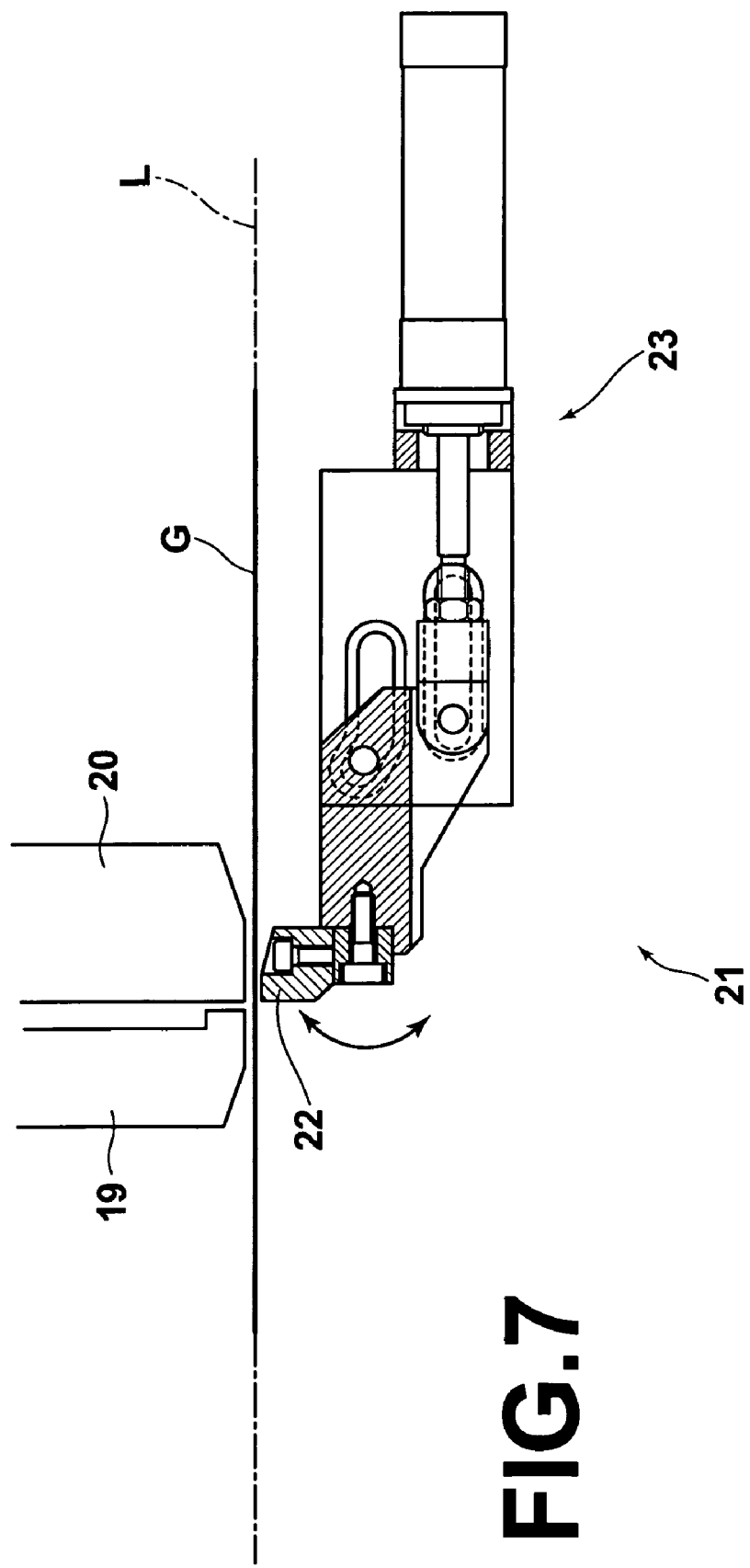
FIG. 7 is a partial sectional view that illustrates a press drive section and a pressing bar of a clamp member, in a state in which the pressing bar is in a glass pressing position.

FIG. 7 illustrates the clamp member 21 in detail. Each clamp member 21 is constituted by: the pressing bar 22, for sandwiching the glass plate G between itself and the clamp support 20; and a press driving section 23, for pressing the pressing bar 22 toward the clamp support 20 (toward the glass plate G), to sandwich the glass plate G.

The clamp 15 grips the glass plate G, and the scribing blade 18 moves vertically in the vicinity of the portion of the glass plate G against which the pressing bar 22 presses, to form the scribe on the glass plate G. When scribing is completed, the scribing blade 18 is retracted. In addition, the scribing support 19 is also retracted, to avoid interfering with a cutting bar 25, which advances toward the glass plate G during cutting thereof. At this time, the verticality of the glass plate G is adjusted by the alignment pins 24, to form the scribe perpendicular with respect to the bottom edge of the glass plate G.

The cutting device 17 will be described with reference to FIGS. 3 through 6. The cutting device 17 is constituted by: the cutting bar 25, which functions as a pressing member for pressing the glass plate G; and drive devices 26, for moving the cutting bar 25 in a direction perpendicular to the direction L of the conveyance path.

Figure 8:
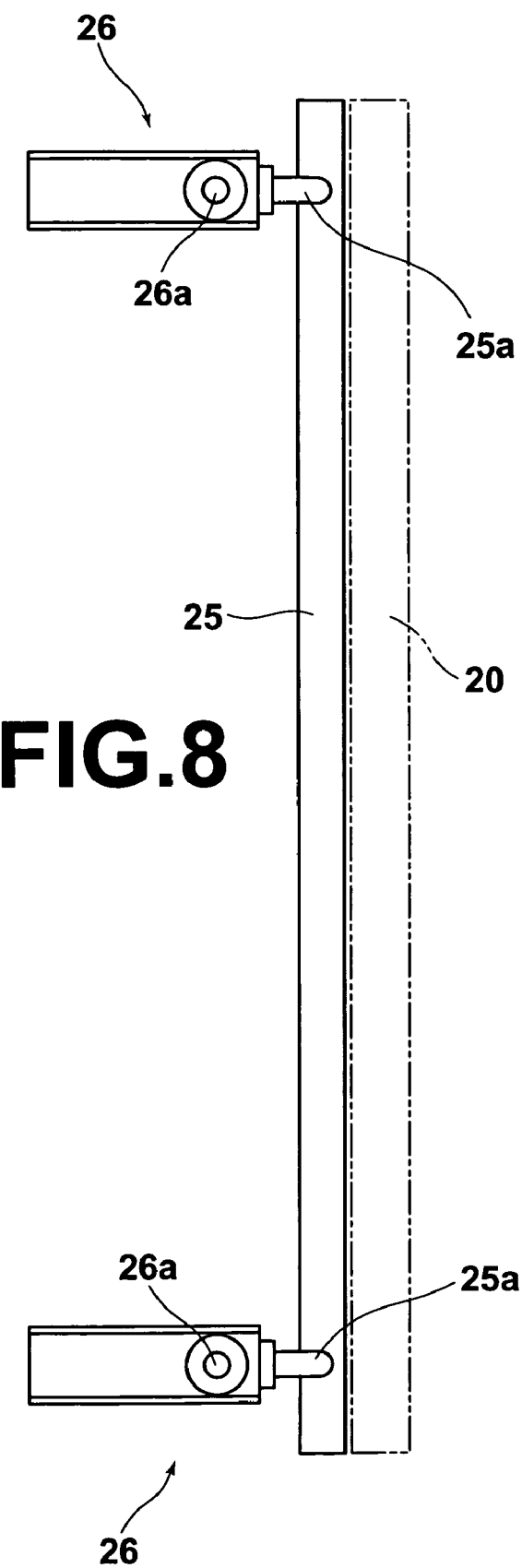
FIG. 8 is a front view of a cutting device of the plate material cutting system of FIG. 1, taken along line VIII-VIII of FIG. 3.

As illustrated in FIGS. 1 and 8, the cutting bar 25 is an elongate member that extends in the vertical direction, which is provided parallel to the surface of conveyed glass plates. The cutting bar 25 extends parallel to the vertical trajectory of the scribing blade 18, the pressing bar 22 of the clamp member 21, and the clamp support 20. Rods of electric cylinders 26a of the drive devices 26 are linked to the cutting bar 25 via arms 25a. The drive devices 26 are mounted at an upper portion and a lower portion of the cutting bar 25, respectively.

When scribing is complete and the scribing blade 18 is retracted, the scribing support 19, which was at a position facing the scribing blade 18 during scribing, is retracted to avoid interfering with the cutting bar 25 when it advances toward the glass plate G. Meanwhile, the clamp 15, that is, the clamp member 21 and the clamp support 20, continue to grip the glass plate G. In the cutting device 17 having the construction described above, the scribing support 19 is moved to a retracted position while the cutting bar 25 presses against the glass plate G. The cutting bar 25 is enabled to cut the glass plate G, by passing a position in the vicinity of the clamp support 20 after the scribing support 19 is retracted.

As illustrated in FIGS. 1 through 6, the cutting device 17 is provided on the opposite side of the conveyance path L from the fluid guide 8. Accordingly, during the cutting operation, the cutting bar 25 presses the surface of the glass plate G on which the scribe is formed, and the fluid guide 8 applies fluid pressure to the other surface of the glass plate G (the surface of the glass plate G opposite that on which the scribe is formed). Therefore, inadvertent cutting of the glass plate at the scribe by factors other than the pressure applied by the cutting bar 25 can be prevented.

The cutting units 11 and 12 which are constructed as described above form the scribes for trimming along the leading and trailing edges of the glass plate G, and the glass plate G can be cut along the scribes.

First, the left cutting unit 11 is moved according to the length of the long side of the glass plate G which is conveyed into the cutting apparatus 2. The glass plate G is positioned such that the leading edge thereof corresponds to the right cutting unit 12, by positioning sensors 27 and 28. The alignment pins 24 are elevated, to cause the bottom edge of the glass plate G to be in a horizontal state perpendicular to the vertical trajectory of the scribing blade 18.

After the clamps 15 of the two cutting units 11, 12 respectively grip the vicinities of the leading and trailing ends of the glass plate G, the scribing blades 18 advance toward the glass plate G. The scribing blades 18 abut portions immediately toward the exterior of the clamps 15 and near the bottom edge of the glass plate G. The scribing blades 18 travel to the top edge of the glass plate G in this state, and the scribes are formed in the vicinities of the leading and trailing edges of the glass plate G.

When scribing is completed, the scribing blades 18 and the scribing supports 19 are retracted. The cutting bars 25 of the cutting units 11 and 12 press the glass plate G toward the exteriors of the scribes in the vicinities of the leading and trailing edges thereof, to cut (trim) the glass plate G. The cut off trimmed portions fall downward and are removed. A trim housing container is provided beneath the cutting apparatus 2. When the cutting operation is completed, the cutting bars 25 return to their original positions, the pressing bars 22 of the clamp members 21 are retracted, and the gripping of the glass plate G is released.

After the leading and trailing edges of the glass plate G are trimmed, the alignment pins 24 are lowered to their initial standby positions, and the glass plate G is placed on the belt conveyor 5. Next, the glass plate G is conveyed to the rotating apparatus 3 to the right of the cutting apparatus 2, to be rotated 90° and conveyed to the long side cutting apparatus 4.

Figure 6:
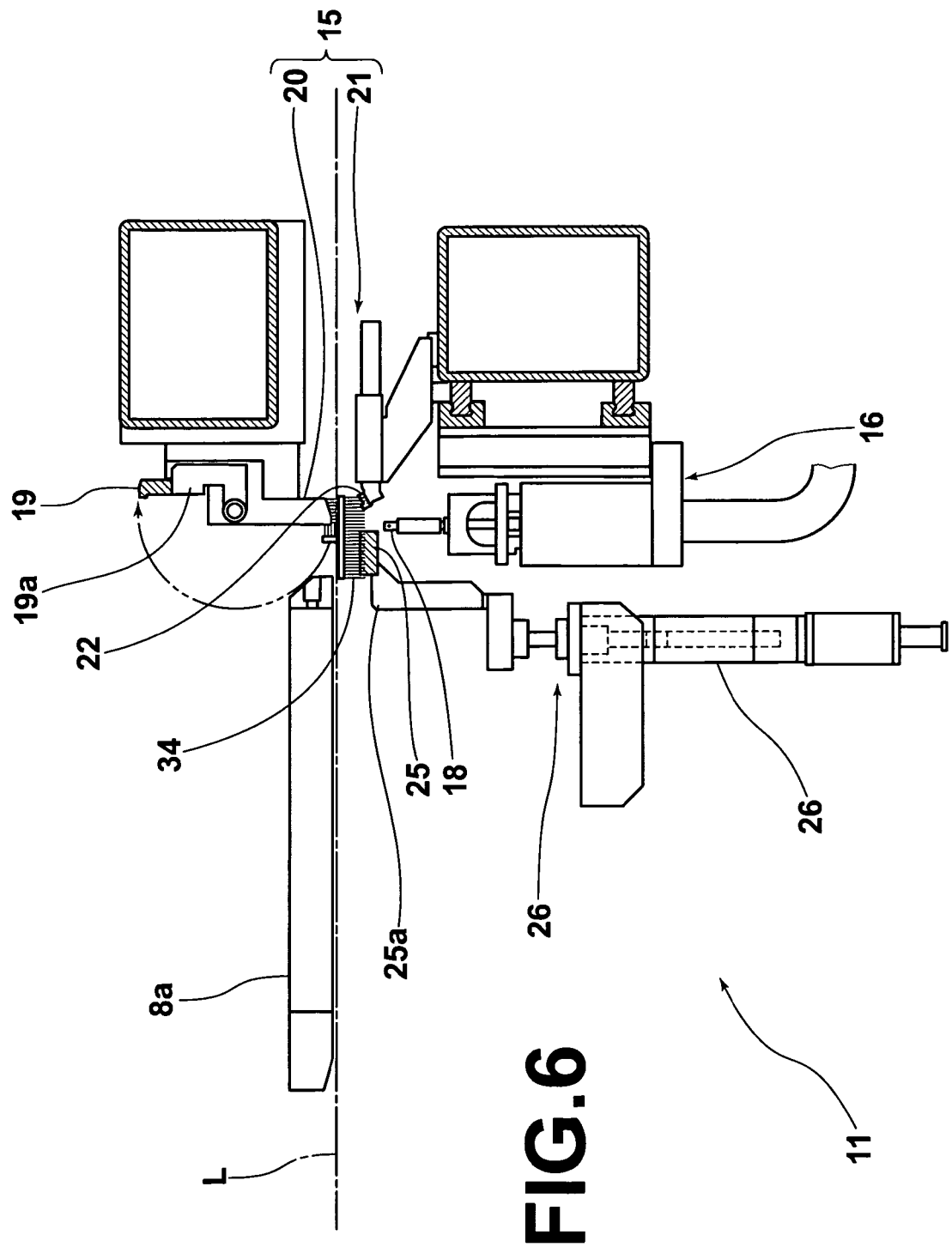
FIG. 6 is a view that illustrates the manner in which a scribing blade of the cutting unit of FIG. 3 is swept, taken along line III-III of FIG. 1.

As illustrated in FIG. 6, brushes 34 provided on each of the cutting units 11 and 12 contact the cutting bar 25, the pressing bar 22, and the clamp support 20 and move from the top ends to the bottom ends thereof to remove cullet particles therefrom, after the cutting operation is completed.

Figure 9:
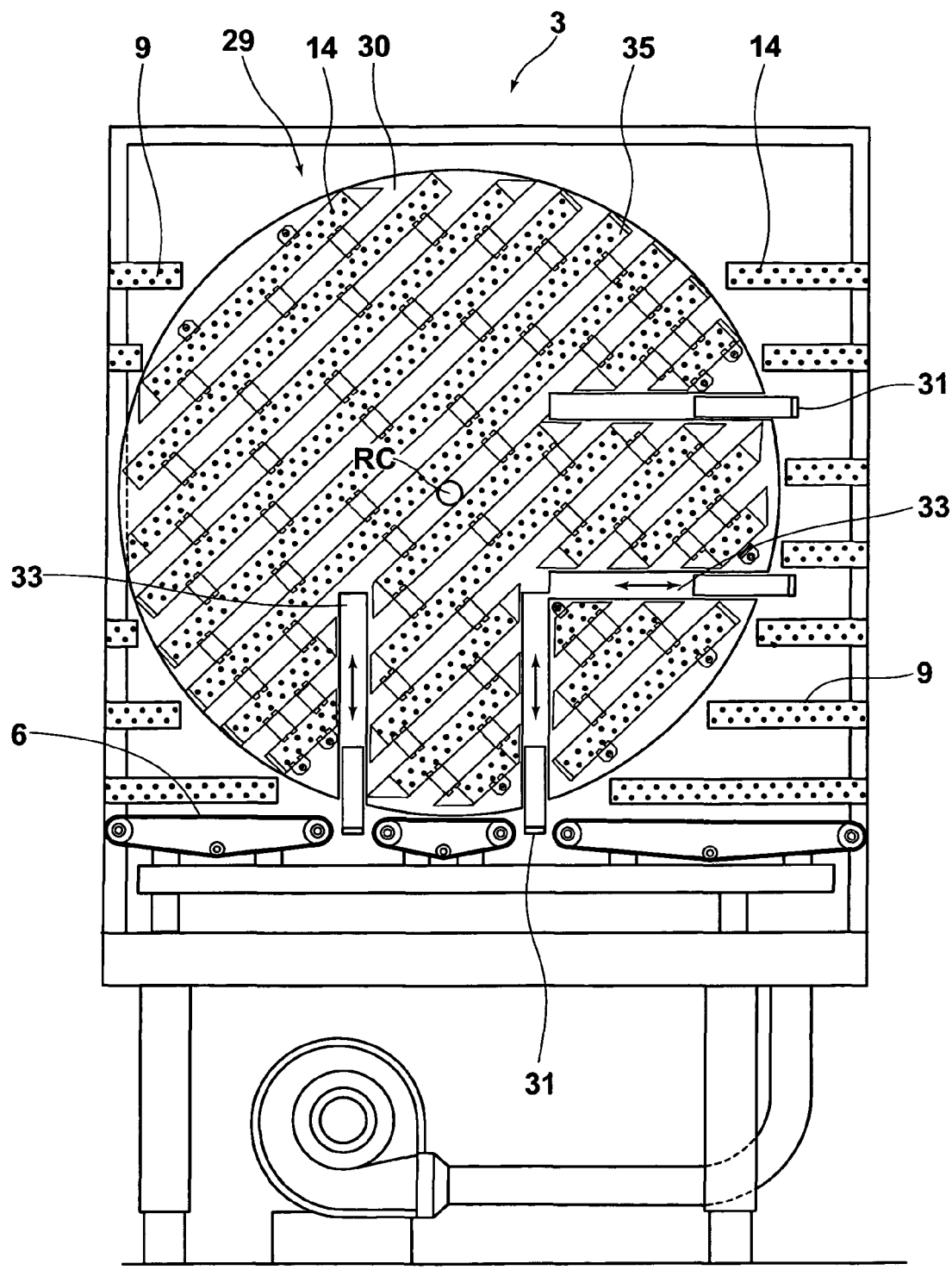
FIG. 9 is a front view of a rotating apparatus of the plate material cutting system of FIG. 1.

The rotating apparatus 3 is illustrated in FIGS. 1, 9, and 10. The rotating apparatus 3 is equipped with a rotating unit 29, for rotating the glass plate G within its plane. The rotating unit 29 is constituted by: a rotating table 30, having a substantially circular outline; engaging members 31, for engaging and supporting two perpendicular edges of the glass plate G to fix it on the rotating table 30; fluid guides 9 provided on both the left and right sides of the rotating table 30; and a rotational drive device 32 (refer to FIG. 10), for rotating the rotating table 30. The shape of the rotating table 30 is not limited to a circular shape.

A rotational output shaft of the rotational drive device 32 is connected to the center RC of the rotating table 30, so as to rotate the rotating table about the center RC thereof. The fluid guides 9 are constituted by pluralities of vertically spaced horizontally extending guide members 13, in the same manner as the fluid guides 8 and 10 of the cutting apparatuses 2 and 4. The fluid exhaust apertures 14 are formed in the guide members 13. Fluid guides 35 which have fluid exhaust apertures 14 formed therein are also provided on the surface of the rotating table 30.

Two sets of the engaging members 31 are provided on the rotating table 30. The engaging members 31 are configured to be capable of linear motion within cutouts 33, which are formed in the rotating table 30 so as to be perpendicular with respect to each other. The engaging members 31 are configured to protrude to an operating position, at which they protrude beyond the fluid guides 35 on the surface of the rotating table 30 and engage the glass plate G (illustrated by the broken lines in FIG. 10), and a retracted position beneath the surfaces of the fluid guides 35 and are disengaged from the glass plate G (illustrated by solid lines in FIG. 10). The engaging members 31 are capable of moving together toward and away from the center RC of the rotating table 30, in order to cause the center of the engaged glass plate G to be positioned at the center RC of the rotating table 30. The glass plate G is rotated after the center thereof is positioned at the rotational center RC of the rotating table 30 in this manner. Therefore, the glass plate G can be rotated about its center. As a result, the rotating apparatus 3 can be made compact.

In the rotating apparatus 3 having the construction described above, the engaging members 31 are at the outermost positions within the cutouts 33 when the glass plate G is being conveyed by the belt conveyor 6. The engaging members 31 engage the glass plate G which is conveyed into the rotating apparatus 3, and move toward the rotational center RC of the rotating table 30 in order to position the center of the glass plate G thereat. The rotating table 30 then rotates 90° in the clockwise direction of FIG. 9. Then, the leading edge of the glass plate G during conveyance becomes the bottom edge, and the bottom edge becomes the trailing edge thereof. In this state, the engaging members 31 move toward the exterior of the rotating table 30. The glass plate G is placed on the belt conveyor 6, and conveyed to the long side cutting apparatus 4 toward the right of the rotating apparatus 3.

The long side cutting apparatus 4 is basically of the same structure as the short side cutting apparatus 2, and the only difference is in the length of the glass plate G trimmed thereby. Therefore, detailed descriptions other than those of the differences will be omitted.

As illustrated in FIG. 1, the glass plate G is conveyed into the long side cutting apparatus 4 with the long side thereof being vertically oriented, and the short side thereof on the conveyance path. Accordingly, the width of the long side cutting apparatus 4 needs only to be as long as the short side of various types of glass plates, and is not as wide as that of the short side cutting apparatus 2, into which the glass plates are conveyed with the long sides thereof on the conveyance path. However, the width of the long side cutting apparatus 4 may be set to be the same as that of the short side cutting apparatus 2, taking the possibility that the order in which the long side and the short side are trimmed is changed.

In addition, in the present cutting system 1, the vertical ranges in which the fluid guides 8 and 10 of the short side cutting apparatus 2 and the long side cutting apparatus 4 are provided are the same. However, in the short side cutting apparatus 2, the short side of the glass plate G is vertically oriented. Therefore, the vertical range in which the fluid guide 8 is provided may be narrower than that of the fluid guide 10 of the long side cutting apparatus 4, in which the long side of the glass plate G is vertically oriented. The glass plate G, of which the long sides are trimmed by the long side cutting apparatus 4, is conveyed out from the cutting system 1 and conveyed to a cleansing apparatus (not shown), an inspection apparatus (not shown), and the like.

Although not illustrated in the Figures, the belt conveyors 5 and 7 that constitute support devices of the cutting apparatuses 2 and 4 may be movable so as to drop glass plates downward. For example, the belt conveyors 5 and 7 may be configured to be movable in a direction perpendicular to the conveyance direction and away from the conveyance path, to drop the glass plates downward. Alternatively, the belt conveyors 5 and 7 may be configured to be capable of tilting, in order to be retracted from the conveyance path L and to drop the glass plates downward. By adopting one of these configurations, glass plates which cannot be subjected to further processing due to damage caused during formation of the scribes can be easily removed, without contaminating the conveyance path or the cutting apparatuses 11 and 12 with glass fragments.

In the present cutting system 1, the fluid guides 8, 9, and 10 are provided only on one side of the conveyance path of the glass plate G. However, the present invention is not limited to such a construction. That is, the fluid guides may be provided along the conveyance direction on both sides of the conveyance path, and the glass plate G may be conveyed in a vertically oriented state by the balanced fluid pressure applied by the fluid guides. By adopting this configuration, the glass plate G can be conveyed in a vertically oriented state, without inclination thereof. There will be regions having fluid guides only on one side of the conveyance path within each of the cutting apparatuses 2 and 4, in order to accommodate the cutting units 11 and 12.

In the present cutting system 1, the short side cutting apparatus 2 is provided upstream of the rotating apparatus 3, and the long side cutting apparatus 4 is provided downstream of the rotating apparatus 3. However, the present invention is not limited to such a configuration. The positions of the short side cutting apparatus 2 and the long side cutting apparatus 4 may be reversed. Further, a cutting system may be realized by a single cutting apparatus and the rotating apparatus 3. In this case, the cutting apparatus trims either the long sides or the short sides of a glass plate, then conveys the glass plate to the rotating apparatus. The rotating apparatus rotates the glass plate 90°, and conveys the glass plate back to the cutting apparatus, where the other of the long sides or the short sides are trimmed. In this case, the tact time will become longer, but the system as a whole can be made more compact.

Glass plates were described as the processing targets of the above embodiments. However, the present invention is not limited to being applied to glass plates. Various plate materials, such as rare metal plates, silicon plates, and plates for flat panel displays, may be processed by the cutting system of the present invention.

According to the present invention, large and thin plate materials can be scribed and cut in a short amount of time without reducing the quality of the cut plate materials. In addition, the cutting system of the present invention can be made compact.

What is claimed is:

1. A plate material cutting unit, comprising:
   support devices for supporting a lower edge of an upright plate material;
   fluid guides for applying fluid pressure on a surface of the plate material which is held upright on the support devices, to support the plate material in a non-contact manner;
   a scribe forming device, equipped with a scribing blade for forming a scribe for cutting on the plate material, by moving along the surface of the plate material, which is supported by the fluid guides;
   a clamp for gripping a portion of the plate material adjacent to a movement trajectory of the scribing blade along the plate material; and
   a cutting device, equipped with a pressing member for pressing a portion of the plate material opposite and adjacent to the scribe in a planar direction with respect to the portion of the plate material which is gripped by the clamp.

2. A plate material cutting unit as defined in claim 1, wherein:
   the scribing blade is provided on a first side of the plate material; and
   a scribing support for supporting the plate material during formation of the scribe is provided on a second side of the plate material at a position facing the scribing blade.

3. A plate material cutting unit as defined in claim 1, wherein:
   the clamp is equipped with a clamp member and a clamp support, for gripping the plate material from both sides;
   the clamp member is provided on the first side of the plate material, and the clamp support is provided on a second side of the plate material; and
   the clamp member and the clamp support are configured to grip the plate material therebetween by the clamp member advancing toward the plate material.

4. A plate material cutting unit as defined in claim 2, wherein:
   the clamp is equipped with a clamp member and a clamp support, for gripping the plate material from both sides;
   the clamp member is provided on the first side of the plate material, and the clamp support is provided on the second side of the plate material;
   the scribing support is movable between a supporting position adjacent to the clamp support, at which the scribing support supports the plate material during formation of the scribe, and a retracted position away from the supporting position; and
   the scribing support is moved to the retracted position when the pressing member presses the plate material.

5. A plate material cutting unit as defined in claim 2, wherein:
   the scribing blade is configured to be capable of being advanced toward and retracted from the plate material; and
   the scribing blade is retracted from the plate material when the pressing member presses the plate material.

6. A plate material cutting unit as defined in claim 2, wherein:
   the fluid guides are provided at least on the second side of the plate material.

7. A plate material cutting unit as defined in claim 1, wherein:
   the support devices constitute a conveyance device that conveys the plate material in the horizontal direction while supporting the plate material in an upright state; and
   the fluid guides are provided along a conveyance path of the conveyance device.

8. A plate material cutting apparatus, comprising:
   a pair of plate material cutting units provided at positions where opposite sides of a plate material are cut, and separated from each other in a horizontal direction on one side of the plate material, each plate material cutting unit comprising:
   first support devices for supporting a lower edge of an upright plate material;

first fluid guides for applying fluid pressure on a surface of the plate material which is held upright on the first support devices, to support the plate material in a non-contact manner;

a scribe forming device, equipped with a scribing blade for forming a scribe for cutting on the plate material, by moving along the surface of the plate material, which is supported by the first fluid guides;

a clamp for gripping a portion of the plate material adjacent to a movement trajectory of the scribing blade along the plate material; and a cutting device, equipped with a pressing member, for pressing a portion of the plate material opposite and adjacent to the scribe in a planar direction with respect to the portion of the plate material which is gripped by the clamp;

second support devices for supporting the lower edge of the upright plate material, provided between the pair of plate material cutting units; and second fluid guides for applying fluid pressure on a surface of the plate material which is held upright on the second support devices, to support the plate material in a non-contact manner, the plate material cutting apparatus being configured to cut left and right sides of the plate material, respectively.

9. A plate material cutting apparatus as defined in claim 8, wherein the clamp, the scribe forming device, and the cutting device of at least one of the pair of plate material cutting units are provided adjacent to each other in this order along the planar direction of the plate material from a side closest to another plate material cutting unit.

10. A plate material cutting apparatus as defined in claim 8, wherein at least one of the pair of plate material cutting units is configured to be capable of approaching and retreating from another plate material cutting unit along the planar direction of the plate material.

11. A plate material cutting apparatus as defined in claim 10, wherein the second fluid guides are constituted by a left fluid guide of the cutting unit provided toward left and a right fluid guide of the cutting unit provided toward right, and
wherein each of the left and right fluid guides are constructed by vertically spaced horizontally extending guide members, for engaging with each other.

12. A plate material cutting apparatus as defined in claim 8, further comprising:
a plurality of alignment members for engaging with the bottom edge of the plate material to elevate the plate material, the alignment members being configured to be positioned such that a line that connects the alignment members is perpendicular with respect to a vertical trajectory of the scribing blade.

13. A plate material cutting apparatus as defined in claim 8, wherein the first support devices constitute a conveyance device that conveys the plate material in the horizontal direction while supporting the plate material in an upright state, and
wherein the first fluid guides are provided along a conveyance path of the conveyance device.

14. A plate material cutting apparatus, comprising:
a pair of plate material cutting units provided at positions where opposite sides of a plate material are cut and separated from each other in a horizontal direction on one side of the plate material, each plate material cutting unit comprising:
first support devices for supporting the lower edge of an upright plate material;
first fluid guides for applying fluid pressure on a surface of the plate material which is held upright on the first support devices, to support the plate material in a non-contact manner;
a scribe forming device, equipped with a scribing blade, for forming a scribe for cutting on the plate material, by moving along the surface of the plate material, which is supported by the first fluid guides;
a clamp for gripping a portion of the plate material adjacent to a movement trajectory of the scribing blade along the plate material; and
a cutting device, equipped with a pressing member, for pressing a portion of the plate material opposite and adjacent to the scribe in a planar direction with respect to the portion of the plate material which is gripped by the clamp;
the scribing blade being provided on a first side of the plate material; and
a scribing support for supporting the plate material being provided on a second side of the plate material at a position facing the scribing blade;
second support devices for supporting the lower edge of the upright plate material, provided between the pair of plate material cutting units; and
second fluid guides for applying fluid pressure on a surface of the plate material which is held upright on the second support devices, to support the plate material in a non-contact manner, the plate material cutting apparatus being configured to cut left and right sides of the plate material, respectively.

15. A plate material cutting apparatus as defined in claim 14, wherein the first support devices constitute a conveyance device that conveys the plate material in the horizontal direction while supporting the plate material in an upright state, and
wherein the first fluid guides are provided along a conveyance path of the conveyance device.

16. A plate material cutting system, comprising:
a plate material cutting apparatus, comprising:
a pair of plate material cutting units provided at positions where opposite sides of a plate material are cut, and separated from each other in a horizontal direction on one side of the plate material, each plate material cutting unit comprising:
first support devices for supporting a lower edge of an upright plate material;
first fluid guides for applying fluid pressure on a surface of the plate material which is held upright on the first support devices, to support the plate material in a non-contact manner;
a scribe forming device, equipped with a scribing blade, for forming a scribe for cutting on the plate material, by moving along the surface of the plate material, which is supported by the fluid guides;
a clamp for gripping a portion of the plate material adjacent to a movement trajectory of the scribing blade along the plate material; and
a cutting device, equipped with a pressing members for pressing a portion of the plate material opposite and adjacent to the scribe in a planar direction with respect to the portion of the plate material which is gripped by the clamp;
second support devices for supporting the lower edge of the upright plate material, provided between the pair of plate material cutting units; and
second fluid guides for applying fluid pressure on a surface of the plate material which is held upright on the second support devices, to support the plate material in a non-contact manner, the plate material cutting apparatus being configured to cut left and right sides of the plate material, respectively, the support devices comprising a conveyance device that conveys the plate material in the horizontal direction while supporting the plate material in an upright state, and the fluid guides being provided along a conveyance path of the conveyance device; and a rotating apparatus provided adjacent to the plate material cutting apparatus, the rotating apparatus being equipped with a rotating unit, for rotating plate materials, which are supported in an upright state within the conveyance path of the conveyance device, substantially within planes thereof.

17. A plate material cutting system, comprising:

a plate material cutting apparatus, comprising:

a pair of plate material cutting units provided at positions where the opposite sides of the plate material are cut, and separated from each other in a horizontal direction on one side of a plate material, each plate material cutting unit comprising:

first support devices for supporting the lower edge of an upright plate material;

first fluid guides for applying fluid pressure on a surface of the plate material which is held upright on the first support devices, to support the plate material in a non-contact manner;

a scribe forming device, equipped with a scribing blade for forming a scribe for cutting on the plate material, by moving along the surface of the plate material, which is supported by the fluid guides;

a clamp for gripping a portion of the plate material adjacent to the movement trajectory of the scribing blade along the plate material; and a cutting device, equipped with a pressing member, for pressing a portion of the plate material opposite and adjacent to the scribe in a planar direction with respect to the portion of the plate material which is gripped by the clamp;

the scribing blade being provided on a first side of the plate material; and a scribing support for supporting the plate material being provided on a second side of the plate material at a position facing the scribing blade;

second support devices for supporting the lower edge of the upright plate material, provided between the pair of plate material cutting units; and second fluid guides for applying fluid pressure on a surface of the plate material which is held upright on the second support devices, to support the plate material in a non-contact manner, the plate material cutting apparatus being configured to cut left and right sides of the plate material, respectively, the support devices comprising a conveyance device that conveys the plate material in the horizontal direction while supporting the plate material in an upright state, and the fluid guides being provided along a conveyance path of the conveyance device; and a rotating apparatus provided adjacent to the plate material cutting apparatus, the rotating apparatus being equipped with a rotating unit, for rotating plate materials, which are supported in an upright state within the conveyance path of the conveyance device, substantially within planes thereof.

18. A plate material cutting system as defined in claim 17, wherein at least one of the pair of plate material cutting units is configured to be capable of approaching and retreating from another plate material cutting unit along the planar direction of the plate material.

19. A plate material cutting apparatus as defined in claim 14, wherein at least one of the pair of plate material cutting units is configured to be capable of approaching and retreating from another plate material cutting unit along the planar direction of the plate material.

20. A plate material cutting apparatus as defined in claim 19, wherein the first support devices constitute a conveyance device that conveys the plate material in the horizontal direction while supporting the plate material in an upright state, and wherein the first fluid guides are provided along a conveyance path of the conveyance device.

21. A plate material cutting system as defined in claim 16, wherein at least one of the pair of plate material cutting units is configured to be capable of approaching and retreating from another plate material cutting unit along the planar direction of the plate material.

* * * * *